(12) United States Patent
Reynolds

(10) Patent No.: US 7,237,356 B1
(45) Date of Patent: Jul. 3, 2007

(54) COMBINATION FISHING ACCESSORY DEVICE

(76) Inventor: Kelly Reynolds, 4712 Kilkenny Dr., Tampa, FL (US) 33610

( * ) Notice: Subject to any disclaimer, the term of this patent is extended or adjusted under 35 U.S.C. 154(b) by 0 days.

(21) Appl. No.: 11/147,844

(22) Filed: Jun. 8, 2005

(51) Int. Cl.
*A01K 87/00* (2006.01)
(52) U.S. Cl. ............................................. 43/25; 43/4.5
(58) Field of Classification Search .................... 43/1, 43/17.5, 25, 4, 4.5; 7/106; 362/119; 73/862.471; 33/511; 30/290
See application file for complete search history.

(56) References Cited

U.S. PATENT DOCUMENTS

| | | | | |
|---|---|---|---|---|
| 2,561,289 A | * | 7/1951 | Paris | 30/296.1 |
| 2,565,633 A | * | 8/1951 | Scott | 362/197 |
| 2,750,184 A | * | 6/1956 | Warndahl | 177/127 |
| 2,791,676 A | * | 5/1957 | Cote | 362/119 |
| 3,521,393 A | * | 7/1970 | Gordon | 43/17 |
| 4,726,140 A | * | 2/1988 | Mears | 43/25 |
| 4,823,498 A | * | 4/1989 | Banta | 43/25 |
| 4,995,188 A | * | 2/1991 | Ewing | 43/23 |
| 5,136,744 A | | 8/1992 | Allsop et al. | 7/106 |
| 5,842,301 A | * | 12/1998 | Cassem | 43/25 |
| 5,962,817 A | * | 10/1999 | Rodriguez | 177/126 |
| 6,045,234 A | * | 4/2000 | Leeds | 362/119 |
| 6,142,769 A | * | 11/2000 | Walker | 431/253 |

* cited by examiner

*Primary Examiner*—Kurt Rowan
(74) *Attorney, Agent, or Firm*—Goldstein Law Offices P.C.

(57) ABSTRACT

A combination fishing accessory device including a line clipper, flashlight, hook sharpener and tape measure for attachment to a fishing rod making it easier and faster for an angler to clip lines, change rigs, sharpen hooks, shine light and measure fish. The device has a body having an underside including a plurality of needle-like protrusions. The body includes two hook and loop fasteners and brackets for securing the body to the fishing rod.

9 Claims, 4 Drawing Sheets

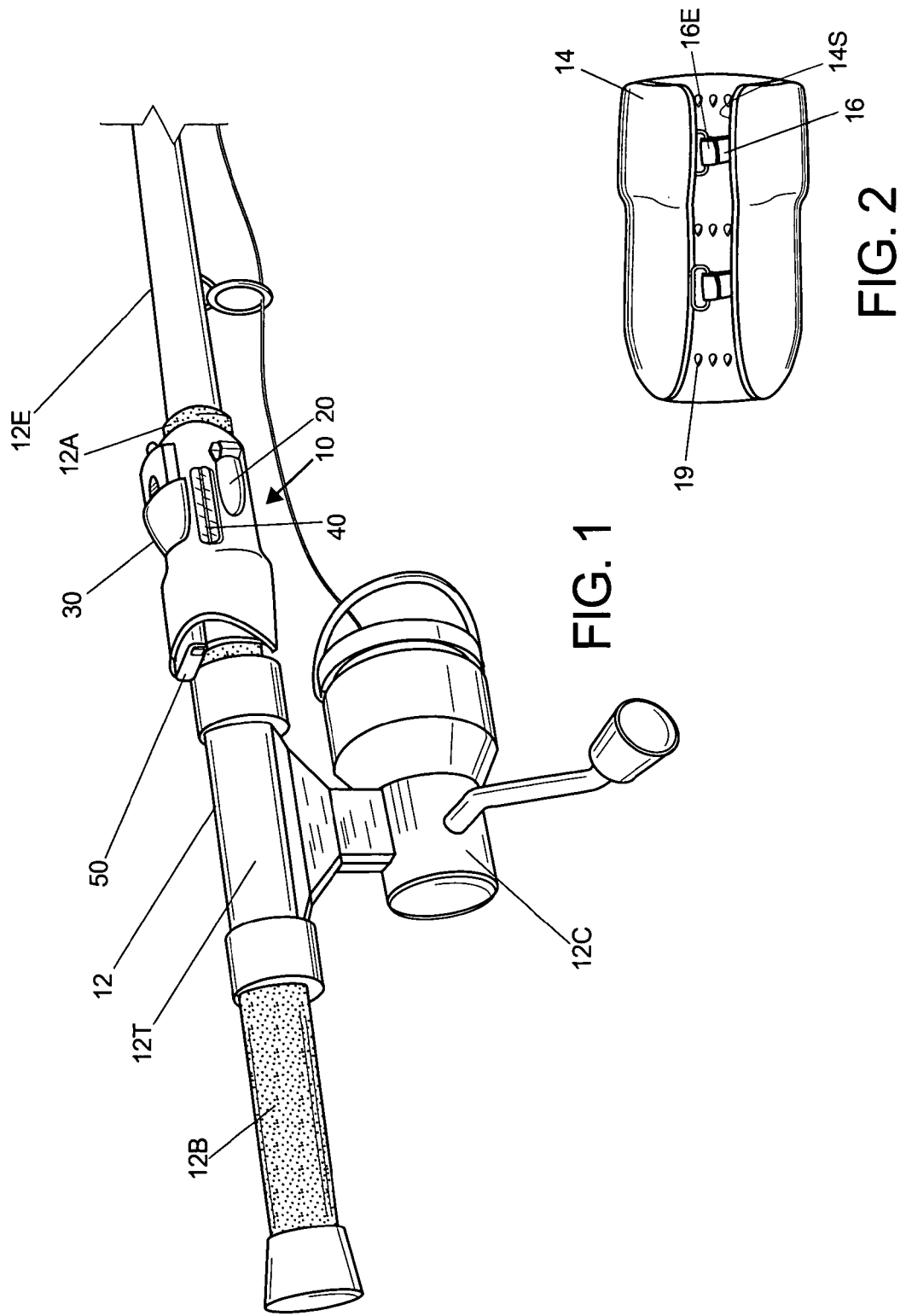

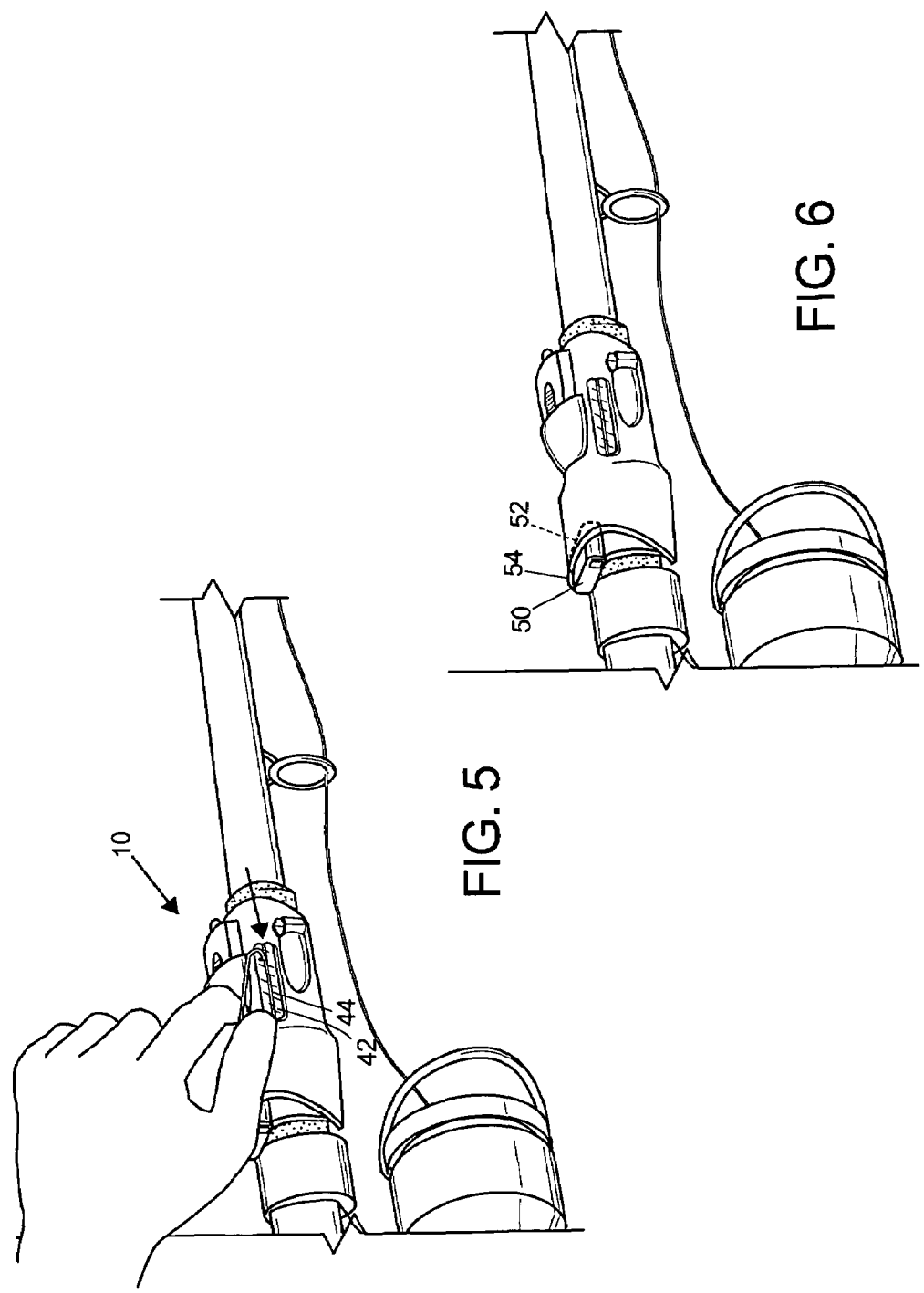

COMBINATION FISHING ACCESSORY DEVICE

BACKGROUND OF THE INVENTION

The invention relates to fishing accessories, and more particularly, to a combination fishing accessory device including a line clipper, flashlight, hook sharpener and tape measure for attachment to a fishing rod making it easier and faster for the angler to clip lines, change rigs, sharpen hooks, shine light in the dark and measure fish.

Fishing is one of the oldest pastimes pursued by man. A fishing rod and associated gear such as hooks, sinkers, and lures are essential items used by most fishermen. Other items such as flashlights, hook sharpeners, and measuring tapes are frequently used. These items are generally stowed away in a tackle box which must be accessed whenever a fisherman wishes to change rigs, illuminate an area, or measure a fish.

U.S. Pat. No. 3,521,393 to Gordon discloses an attachment for a fishing pole comprised of a piston and cylinder used to cut lines and sharpen fishhooks. U.S. Pat. No. 4,726,140 to Mears discloses a fishermen's line cutter device comprised of a plastic body having an integral razor blade, attached to a fishing pole. U.S. Pat. No. 5,136,744 to Allsop discloses a multipurpose fishing tool.

While these units may be suitable for the particular purpose employed, or for general use, they would not be as suitable for the purposes of the present invention as disclosed hereafter.

SUMMARY OF THE INVENTION

It is an object of the invention to produce a means for making it easier and faster for an angler to clip lines, change rigs, sharpen hooks, shine light in the dark and measure fish. Accordingly, the invention is a combination fishing accessory device including a line clipper, flashlight, hook sharpener and tape measure for attachment to a fishing rod making it easier and faster for the angler to clip line, change rigs, sharpen hooks, shine light in the dark and measure fish.

It is another object of the invention to provide a means for easily attaching the combination fishing accessory device to a fishing rod such that it is out of the way but always within finger tip reach. Accordingly, the device includes a body that is substantially circular and countered and includes hook and loop fasteners for easily snapping and wrapping around a top of a foam grip right above a fishing reel for being out of the way but always within finger tip reach.

It is another object of the invention to provide a combination fishing accessory device capable of fitting onto different size fishing poles. Accordingly, the body of the device is flexible and can be stretched open and contoured around a variety of differently sized and shaped fishing rods.

It is another object of the invention to provide a means for preventing the combination fishing accessory device from slipping or wiggling free over time and flying off during casting. Accordingly, the body of the device includes an underside having a plurality of needle-like protrusions extending outwardly therefrom for embedding and digging into the foam grip of the fishing rod to anchor and prevent the device from wiggling loose over time or flying off during casting.

It is another object of the invention to provide a means for clipping lines and changing rigs faster. Accordingly, the line clipper of the invention has a retractable cord that easily extends and retracts for allowing an angler to easily grasp the line clipper and clip lines and change rigs faster than ever.

It is another object of the invention to provide a means for shinning light on a tangle or knot in line, or along a path, or into a tackle box, without easily dropping or loosing the light. Accordingly, the flashlight of the invention extends outwardly along a retractable cord in order to provide light to a fishermen without fear of loosing or dropping the flashlight.

It is another object of the invention to help fishermen catch more fish by increasing the number of hook ups. Accordingly, the hook sharpener of the invention is optimally positioned within the body of the device for a quick sharp point on a hook, increasing the number of hook ups and thereby helping anglers catch more fish.

It is another object of the invention to provide a means for conveniently storing a tape measure within the body of the device. Accordingly, the tape measure of the invention is easily held in position within the body of the device by a hook and loop fastener which allows the tape measure to be easily removed, or replaced if damaged.

This invention is a combination fishing accessory device including a line clipper, flashlight, hook sharpener and tape measure for attachment to a fishing rod making it easier and faster for an angler to clip lines, change rigs, sharpen hooks, shine light and measure fish. The device has a body having an underside including a plurality of needle-like protrusions. The body includes two hook and loop fasteners and brackets for securing the body to the fishing rod.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

FIG. 1 is a diagrammatic perspective view of the combination fishing accessory device of the present invention having a body including a line clipper, flashlight, hook sharpener and tape measure for attachment to a fishing rod making it easier and faster for the angler to clip lines, change rigs, sharpen hooks, shine light in the dark and measure fish.

FIG. 2 is a diagrammatic perspective view of an underside of the body of the combination fishing accessory device of the present invention, wherein the body includes two hook and loop fasteners about two brackets for easily securing the invention to the fishing rod.

FIG. 5 is a side elevational view of the combination fishing accessory device of the present invention, wherein a hook sharpener including a sharpening groove is used for conveniently sharpening hooks.

FIG. 6 is a side elevational view of the combination fishing accessory device of the present invention, wherein embedded within the body is the line clipper, flashlight, hook sharpener and tape measure all configured for optimal use and convenience.

DETAILED DESCRIPTION OF THE PREFERRED EMBODIMENTS

Figure 4:
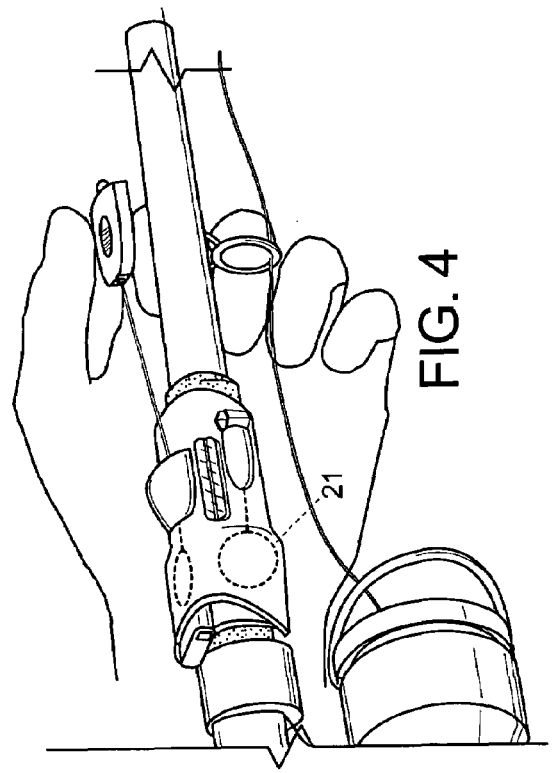
FIG. 4 is a right side elevational view of the combination fishing accessory device of the present invention, wherein a spool is attached to a retractable cord for allowing the line clipper to extend outwardly and retract inwardly therefrom.

FIG. 1 illustrates a combination fishing accessory device 10 including a line clipper 20, flashlight 30, hook sharpener 40 and tape measure 50 for attachment to a fishing rod 12 making it easier and faster for an angler to clip lines, change rigs, sharpen hooks, shine light in the dark and measure fish.

The combination fishing accessory device 10 includes a body 14 that is substantially circular and contoured. The body 14 includes an underside 14U, shown in FIG. 2, which easily contours around the fishing rod 12 where a blank 12A extends out of a top 12T of a foam grip 12B right above a fishing reel 12C for being out of the way but always within finger tip reach.

FIG. 2 illustrates the underside 14U of the body 14 which includes two side edges 14S parallel to one another and spaced apart. One side edge 14S includes two hook and loop fasteners 16 both having a free end 16E. The opposite side edge includes two brackets 18 substantially aligned with the hook and loop fasteners 16 such that the free ends 16E of the hook and loop fasteners 16 are easily inserted up through the brackets 18 and coupled back to the hook and loop fastener 16 for easily snapping and wrapping the body 14 around the fishing rod 12.

In addition, the underside 14U of the body 14 includes a plurality of needle-like protrusions 19 extending outwardly therefrom for embedding and digging into the foam grip 12B of the fishing rod 12 to anchor and prevent the device from wiggling loose over time or flying off during casting.

Preferably, the body 14 is made of a flexible material that can be stretched open and contoured around a variety of differently sized and shaped fishing rods.

Figure 3:
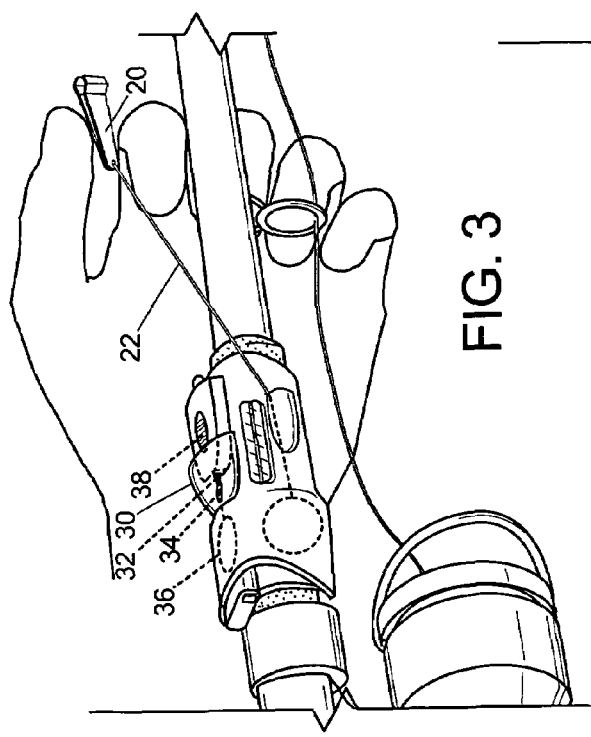
FIG. 3 is a diagrammatic perspective view of the line clipper of the combination fishing accessory device of the present invention in use.

Embedded within the body 14 is the line clipper 20, flashlight 30, hook sharpener 40 and tape measure 50 all configured for optimal use and convenience. FIG. 3 illustrates the line clipper 20 in use for easily clipping lines and changing rigs faster. The line clipper 20 includes a retractable cord 22 about a spool 21, shown in FIG. 4 which is encased within the body 14, that easily extends and retracts for allowing the angler to easily grasp the line clipper in order to clip lines and change rigs faster than ever. The line clipper 20 is substantially similar to a standard clipper used for clipping nails and includes two substantially elongated members 24 connected together at a connection point 26 and extending outwardly therefrom, each including a sharp outer edge 28 which correctly align together for cutting material placed therebetween. When a user squeezes the elongated members 24 together at the connection point 26 the elongated members 24 clamp down to cut material therebetween. The connection point 26 includes a hole 29 therethrough for securing to the retractable cord 22.

In use, the line clipper 20 is easily pushed or pulled out from being embedded within the body 14, shown in FIG. 6, and grasped by the angler by fingers and a thumb. Anglers can use the line clipper 20 while extended on the retractable cord 22 to clip lines and change rigs faster than ever. The line clipper 20 can then be retracted back into the spool 21, shown in FIG. 4, and tucked away on the body 14 of the combination fishing accessory device 10 on the fishing rod 12.

FIG. 3 also illustrates the flashlight 30. The flashlight 30 is a compact and miniature flashlight which is easily held along the body 14 of the combination fishing accessory device 10 by being slightly embedded within the body 14, shown in FIG. 6. The flashlight 30 includes a small circular hole 32. A retractable cord 34 is fastened through the circular hole 32 and around a spool 36 which is encased within the body 14. The flashlight 30 is easily pulled outwardly and pushed inwardly by the thumb or fingers of the angler, and is extended along the retractable cord 34 about the spool 36 for use shinning light in dark areas. The flashlight 30 can be used at night to shine light on a tangle or knot in a fishing line, to shine light along a path, or to shine light in a tackle box for help finding an item therein. Similar to the line clipper 20, the flashlight 30 is extendable on the retractable cord 34 or can remain stationary against the body 14. The flashlight 30 has an switch 38 used to turn the flashlight 30 both on and off. The switch 38 is capable of providing permanent continuous light that shines as long as necessary, or until being turned off. The spool 36 extends and retracts within the body 14. The body 14 may also include a strap 39 for securely holding the flashlight 30 against the body 14.

FIG. 5 illustrates the hook sharpener 40 of the combination fishing accessory device 10. The hook sharpener 40 is a substantially elongated oval shaped member 42 embedded within the body 14. The hook sharpener 40 includes a sharpening groove 44 which bisects the oval shaped member 42 and is conveniently accessible to quickly make a sharp point on a fish hook, for increasing hookups which in turn help anglers catch more fish. In use, the angler runs a fishing hook 13 directly along the sharpening groove 44 for sharpening the fishing hook 13.

Figure 7:
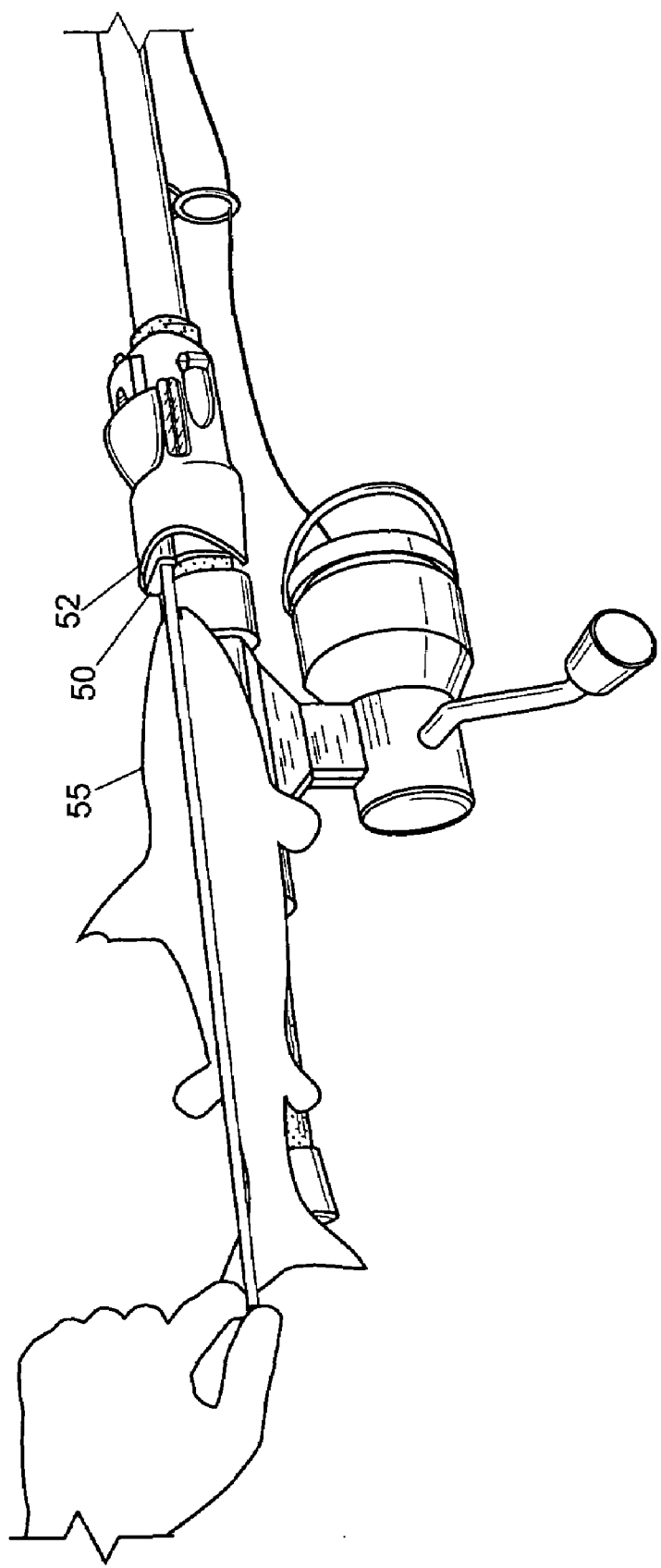
FIG. 7 is a side elevational view of the combination fishing accessory device of the present invention, wherein a fish is being measured with the tape measure feature thereof.

FIG. 6 illustrates the tape measure 50 of the present invention. The underside 14U of the body 14 includes a pocket 52 substantially circular in shape for housing the tape measure 50 therein. In addition, the body 14 can include a strap 54 which can be a snap or a hook and loop fastener for securing the tape measure 50 within the pocket 52. Furthermore, the pocket 52 is positioned in between the spool 21 for the line clipper 20 and the spool 36 for the flashlight 30 all within the body 14. Referring to FIG. 7, In use, the angler can quickly and conveniently measure a fish 55 fish using the tape measure 50—even while the tape measure 50 is still attached within the pocket 52.

FIG. 1 illustrates how the angler would easily attach the combination fishing accessory device 10 to the fishing rod 12. Here, the angler positions the device 10 on the top 12T of the foam grip 12B such that the fishing reel 12C is between the device 10 and the foam grip 12B. The underside 14B of the body 14 snaps onto the fishing rod 12 such that the flashlight 30 and line clipper 20 are pointing toward a tip 12E of the fishing rod 12. The underside 14U of the body 14 is placed over the foam grip 12B near the top 12T such that the needle-like protrusions 19 extend into the foam grip 12B and the body 14 is stretched wide enough to fit onto the fishing rod 12. The free ends 16E of the hook and loop fasteners 16 are then easily inserted up through the brackets 18 and coupled back to the hook and loop fastener 16 for easily snapping and wrapping the body 14 around the fishing rod 12. The device 10 can be left in position on the fishing rod 12 indefinitely or removed as desired.

In conclusion, herein is presented a combination fishing accessory device. The invention is illustrated by example in the drawing figures, and throughout the written description.

It should be understood that numerous variations are possible, while adhering to the inventive concept. Such variations are contemplated as being a part of the present invention.

What is claimed is:

1. A combination fishing accessory device for use by an angler with a fishing rod having a foam grip having a top and a fishing reel, comprising:
    a body substantially circular and contoured of a flexible material having an underside which easily contours around the fishing rod having a foam grip right above the fishing reel, the underside including two side edges parallel to one another and spaced apart, one side edge including two hook and loop fasteners both having a free end, the opposite side edge including two brackets substantially aligned with the hook and loop fasteners such that the free ends of the hook and loop fasteners easily insert up through the brackets and couple back to the hook and loop fastener for easily snapping and wrapping the body around the fishing rod, the underside having a plurality of needle-like protrusions extending outwardly therefrom for embedding and digging into the foam grip of the fishing rod to anchor and prevent the device from wiggling loose over time or flying off during casting, the underside including a pocket substantially circular in shape, the body including a strap near one of the side ends;
    a line clipper embedded within the body and having two substantially elongated members connected together at a connection point and extending outwardly therefrom, each including a sharp outer edge which align together for clamping down and cutting material placed therebetween, said line clipper having a retractable cord about a spool encased within the body, the connection point including a hole therethrough for securing to the retractable cord for extending and retracting the line clipper therefrom;
    a compact and miniature flashlight easily held along the body of the device by being slightly embedded within the body, including a integrally coupled switch centrally located thereon for turning the flashlight on and off, the flashlight including a small circular hole near the switch and a retractable cord fastened through the small circular hole and around the spool encased within the body, wherein the strap of the body securely holds the flashlight against the body;
    a hook sharpener having a substantial elongated oval shaped member embedded within the body and a sharpening groove bisecting the oval shaped member to quickly put a sharp point on a fish hook for increasing hookups; and
    a tape measure housed within the pocket of the body, having a strap for securing the tape measure therein, the pocket being positionable between the spool of the line clipper and the spool of the flashlight.

2. A combination fishing accessory device for use by an angler with a fishing hook and a fishing rod having a foam grip having a top and a fishing reel, comprising:
    a body substantially circular and contoured of a flexible material having an underside which easily contours around the fishing rod, the underside including a pocket substantially circular in shape, the body including a strap near one of the side ends;
    a line clipper embedded within the body and having two substantially elongated members connected together at a connection point and extending outwardly therefrom, each including a sharp outer edge which align together for clamping down and cutting material placed therebetween, said line clipper having a retractable cord about a spool encased within the body;
    a compact and miniature flashlight easily held along the body of the device by being slightly embedded within the body, including a integrally coupled switch centrally located thereon for turning the flashlight on and off, the flashlight including a small circular hole near the switch and a retractable cord fastened through the small circular hole and around the spool encased within the body, wherein the strap of the body securely holds the flashlight against the body;
    a hook sharpener having a substantial elongated oval shaped member embedded within the body and a sharpening groove bisecting the oval shaped member for quickly putting a sharp point on a fish hook increasing hookups; and
    a tape measure housed within the pocket of the body having a strap for securing the tape measure therein.

3. The combination fishing accessory device of claim 2, wherein the body is positionable around the top of the foam grip right above the fishing reel.

4. The combination fishing accessory device of claim 3, wherein the underside includes two side edges parallel to one another and spaced apart, one side edge including two hook and loop fasteners both having a free end, the opposite side edge including two brackets substantially aligned with the hook and loop fasteners such that the free ends of the hook and loop fasteners easily insert up through the brackets and couple back to the hook and loop fastener for easily snapping and wrapping the body around the fishing rod.

5. The combination fishing accessory device of claim 4, wherein the underside has a plurality of needle-like protrusions extending outwardly therefrom for embedding and digging into the foam grip of the fishing rod to anchor and prevent the device from wiggling loose over time or flying off during casting.

6. The combination fishing accessory device of claim 5, wherein the connection point includes a hole therethrough for securing to the retractable cord for extending and retracting the line clipper therefrom.

7. The combination fishing accessory device of claim 6, wherein the pocket being positionable between the spool of the line clipper and the spool of the flashlight.

8. A method of attaching a fishing accessory device to a fishing rod, the fishing rod having a foam grip having a top and tip and a fishing reel, the fishing rod accessory device having a body having an underside having needle-like protrusions, having hook and loop fasteners having free ends and brackets, a flashlight, a line clipper, a tape measure, and a hook sharpener, the steps comprising:
    positioning the device over the foam grip with the flashlight and line clipper pointing toward the tip of the fishing rod by stretching the body over the top of the foam grip allowing the underside to snap onto the fishing rod and the needle-like protrusions to extend into the foam grip; and
    securing the body to the fishing rod by inserting the free ends of the hook and loop fasteners up through the brackets and coupled back to the hook and loop fasteners.

9. A method of clipping lines, changing rigs, sharpening hooks, shining light and measuring fish by an angler using a fishing rod accessory device having a body having a strap, a line clipper having a retractable cord and spool, a flashlight having a switch, a retractable cord and a spool, a hook sharpener having a sharpening groove, a tape measure having a strap, and a fish hook, the steps comprising:

clipping lines and changing rigs faster than ever by pushing or pulling the line clipper out from being embedded within the body by extending and retracting the retractable cord of the line clipper about the spool;

shining light by turning the switch on and pulling outwardly or pushing inwardly the retractable cord about the spool of the flashlight;

sharpening the fish hook by running the fishing hook directly along the sharpening groove of the hook sharpener; and measuring the fish with the tape measure.

* * * * *